United States Patent [19]
Chun et al.

[11] Patent Number: 5,400,423
[45] Date of Patent: Mar. 21, 1995

[54] MOLDED STAR COUPLER AND METHOD OF MAKING SAME

[75] Inventors: Christopher K. Y. Chun, Mesa; Michael S. Lebby, Apache Junction; Shun-Meen Kuo, Chandler, all of Ariz.

[73] Assignee: Motorola, Schaumburg, Ill.

[21] Appl. No.: 116,638

[22] Filed: Sep. 7, 1993

[51] Int. Cl.$^6$ .............................................. G02B 6/26
[52] U.S. Cl. ........................................ 385/46; 359/900
[58] Field of Search ..................... 385/39, 45, 46, 48, 385/49, 51, 52, 147, 146; 359/900

[56] References Cited

U.S. PATENT DOCUMENTS

| | | | |
|---|---|---|---|
| 4,904,042 | 2/1990 | Dragone | 385/46 |
| 5,208,885 | 5/1993 | Dragone et al. | 385/46 |
| 5,297,228 | 3/1994 | Yanagawa et al. | 385/49 |

FOREIGN PATENT DOCUMENTS 4-128809  4/1992  Japan ................................... 385/49

Primary Examiner—Rodney B. Bovernick
Assistant Examiner—John Ngo
Attorney, Agent, or Firm—Gary F. Witting

[57] ABSTRACT

A first molded optical portion having a major surface with a free space and a first and a second plurality of core regions are disposed on the major surface of the first optical portion. A first and a second plurality of ends of the first and the second plurality of core regions are located at a first and a second end surfaces of the molded optical portion. A free space area is located between the first and the second plurality of core regions.

3 Claims, 1 Drawing Sheet

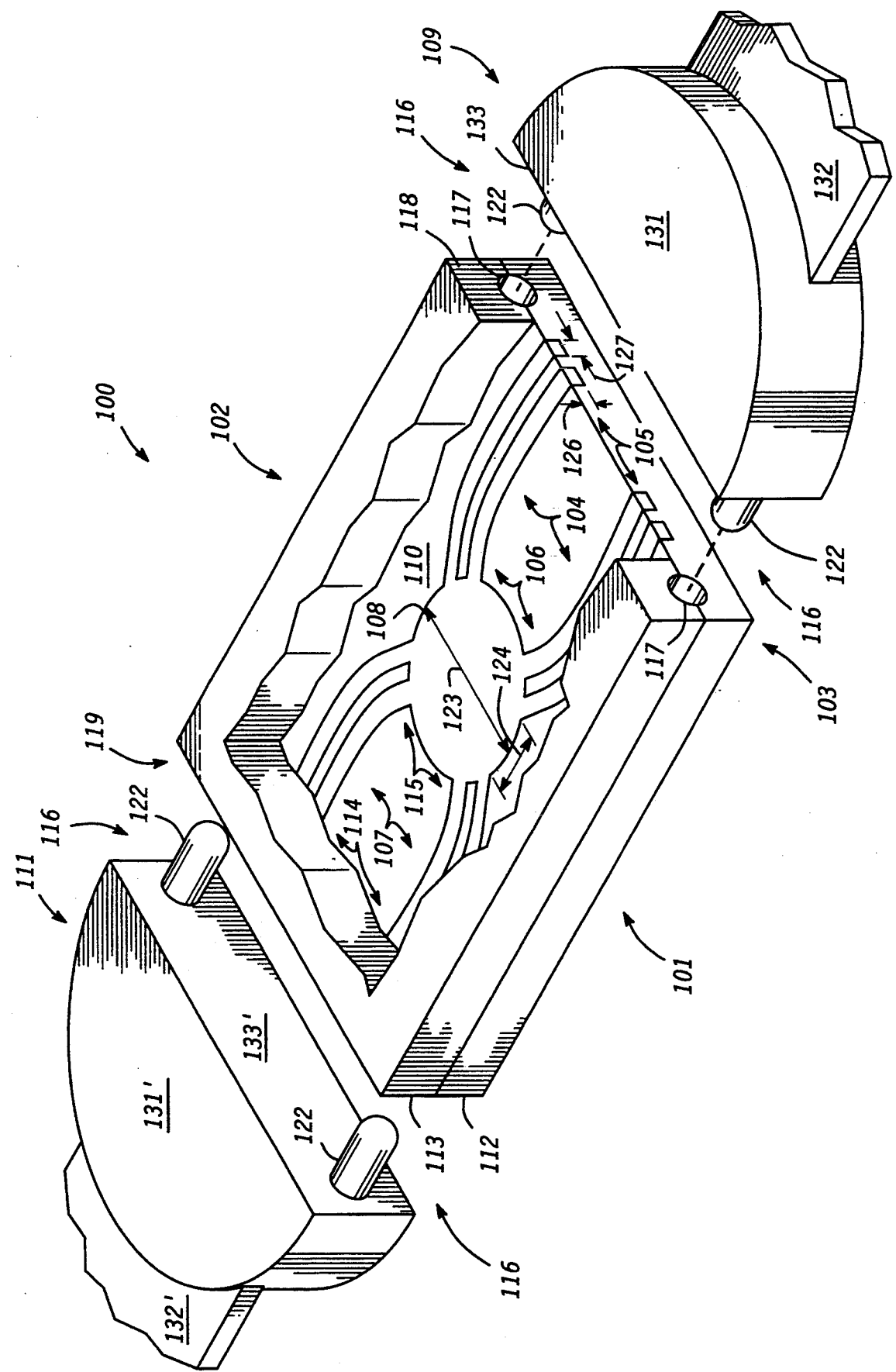

MOLDED STAR COUPLER AND METHOD OF MAKING SAME

BACKGROUND OF THE INVENTION

This invention relates, in general, to fabrication of optical devices and, more particularly, to fabricating optical star couplers.

This application is related to U.S. Pat. No. 5,265,184, issued on Nov. 23, 1993, bearing Ser. No. 07/889,335, titled MOLDED WAVEGUIDE AND METHOD FOR MAKING SAME, filed on May 28, 1992, which is hereby incorporated by reference herein, and to U.S. Pat. No. 5,265,184, issued on Nov. 23, 1993, bearing Ser. No. 08/019,731, titled MOLDED WAVEGUIDE WITH A UNITARY CLADDING REGION AND METHOD OF MAKING, filed on Feb. 19, 1993, now U.S. Pat. No. 5,313,545.

At present, fabrication of an optical star coupler is achieved either alone or in combination with photolithographic and etching techniques, both of which are expensive and difficult to control. Additionally, while both fabrication techniques are extensively used in a semiconductor art, use of both of these fabrication techniques for fabricating star couplers in high volume manufacturing environment are needlessly complex and expensive.

Briefly, as practiced by one method in the prior art, a photolithographic polymer film is spun onto a silicon substrate. Portions of the photolithographic film are subsequently exposed, developed, and etched, thereby removing portions of the silicon substrate. The remaining photolithographic film subsequently is removed. Once the photolithographic film is removed, a silicon dioxide (SiO$_2$) layer is deposited onto the etched silicon substrate, thereby filling the channels with SiO$_2$ that were previously etched into the silicon substrate. The oxide film is then planarized by any suitable method so as to bring the silicon dioxide and the substrate into equal planarity, thereby generating waveguides or core regions in the silicon substrate.

However, the briefly outlined processes described hereinabove, are complicated, difficult to control, and unnecessarily expensive. Further, it should be noted that each additional processing step incurs an additional cost, as well as presenting an opportunity to induce defects into the star coupler.

It can be readily seen that conventional methods for making star couplers have severe limitations. Also, it is evident that the conventional processing uses a plurality of steps which are not only complex and expensive, but also are not efficient and effective for high volume processing. Therefore, a method for making the star coupler that provides a reduction in the number of steps required, reduces cost, and simplifies the processes necessary for making a star coupler would be highly desirable.

SUMMARY OF THE INVENTION

Briefly stated, an article and method for making a molded optical star coupler is provided. A first molded optical portion having a surface, a first end surface and a second end surface, the surface having a free space, a first and a second plurality of core regions with each plurality of core regions having a first and a second plurality of ends, respectively, is disposed on the surface of the first optical portion. The first plurality of ends of the first plurality of core regions are located at the first end surface of the molded optical portion and the second plurality of ends is located at the free space area with the first plurality of core regions extending therebetween. The first plurality of ends of the second plurality of core regions are located at the second end surface of the molded optical portion and the second plurality of ends are optically coupled to the free space area with the second plurality of core regions extending therebetween, thereby optically coupling the first plurality of ends of the first plurality of core regions to the second plurality of ends of the second plurality of core regions through the free space region.

BRIEF DESCRIPTION OF THE DRAWING

The sole FIGURE is a simplified greatly enlarged perspective view of a star coupling assembly utilizing a molded star coupler embodying the present invention.

DETAILED DESCRIPTION OF THE DRAWING

The sole FIGURE is a simplified greatly enlarged perspective view of a star coupling assembly 100 utilizing a molded star coupler 101 with a portion 102 thereof removed, thus illustrating inner elements of molded star coupler 101. Star coupling assembly 100 includes molded star coupler 101, a first optical connector 109, and a second optical connector 111. Molded star coupler 101 includes an optical portion 103 that is capable of being divided into a first optical part 112 and a second optical part 113 both of which are discussed in detail hereinafter. Optical portion 103 includes a surface or a major surface 110, a first plurality of core regions 104 and a second plurality of core regions 107, and a free space area 108 disposed in surface 110. It should be understood that the sole FIGURE is greatly simplified, thus many of the engineering details have been omitted in order to better illustrate the present invention more clearly. Further, is should be noted that molded star coupler 101 is possibly made in a variety of sizes depending upon a specific application of molded star coupler 101, thus the sole FIGURE does not represent any absolute dimensions except for this particular embodiment of the present invention.

Generally, molded star coupler 102 is made of a hard optical transparent polymer, wherein the first and the second plurality of core regions 104 and 107, as well as free space area 108 have a higher refractive index than does optical portion 103. Commonly, optical portion 103 has a refractive index that is at least 0.01 lower then that of free space area 108 and the first and the second plurality of core region 104 and 107, thereby providing appropriate refractive index for guiding light signals through the first and the second plurality of core regions 104 and 107, as well as free space area 108. Further, by providing the appropriate refractive index to the first and the second plurality of core regions 104 and 107, as well as to the free space area, mixing of the light signals in the free space area 108 is achieved. Moreover, it should be understood that optical portion 103 is capable of being manufactured in accordance to the previously mentioned references.

Briefly, in a preferred embodiment of the present invention, optical portion 103 is molded as a first optical part 112 and a second optical part 113. First optical part 112 of optical portion 103 is molded with a first and a second plurality of grooves, as well as a cavity that correspond to the first and the second plurality of core regions 104 and 107 and free space area 108, respectively. Also, the first plurality of grooves are molded having a first and a second plurality of ends. The first and the second plurality of ends of the first plurality of grooves correspond to a first and a second plurality of ends 105 and 106 of the first plurality of core regions 104. The first plurality of ends of the first plurality of grooves are molded so as to expose a cross section of the plurality of grooves on end surface 118 of optical portion 103. The second plurality of ends of the first plurality of grooves are molded so as to communicate or open into the cavity.

The second plurality of grooves are molded with a first and a second plurality of ends that corresponding to a first and a second plurality of ends 114 and 115 of the second plurality of core regions 107. The first plurality of ends of the second plurality of grooves are molded so as to expose a cross section of the plurality of grooves on surface 119. The second plurality of ends of the second plurality of grooves are molded to communicate or open into the cavity, corresponding to free space area 108.

Both the first and the second plurality of grooves are capable of being molded in a variety of shapes, sizes, and configurations depending upon specific design requirements. For example, the first and the second plurality of grooves are possibly configured in a variety of configurations, such as straight lines, angled lines, or serpentine lines. Molding the first and second plurality of groves into serpentine lines allows for a larger number of grooves, ultimately core regions, to be opened or communicate with the cavity. Additionally, it should be understood that the first and the second plurality of grooves are capable of being molded in a variety of shapes and cross-sections, such as cones, adiabatic tapers, rectangular grooves, or the like.

The cavity which corresponds to free space 108 is molded simultaneously with the first and the second plurality of grooves. Generally, the cavity is molded in a cylindrical shape with the first ends of the first and the second plurality of grooves opening to the cavity. However, it should be understood that the cavity also is capable of being shaped in a sphere, thus allowing for a three dimensional communication between other pluralities of core regions (not shown). Sizing of the cavity while important is determined by practical application of each specific use.

For example, a first distance and a second distance, represented by arrows 123 and 124, of the cavity is capable of being any suitable distance depending upon the specific application. Generally, distance 123 ranges from 4.0 microns to 1.0 centimeter and distance 124 ranges from 10.0 microns to 1.0 centimeter. However, in a preferred embodiment of the present invention, distance 123 ranges from 1.0 millimeter to 4.5 millimeters with distance 124 ranging from 1.0 millimeter to 4.5 millimeters. Additionally, it should be understood that some geometric forms described by distance 123 and 124 are more efficient in transferring light signals from the first plurality of core regions 104 to the second plurality or core regions 107 through free space 108. Further, depth 126 of the plurality of core regions generally is similar to a depth of the cavity. However, it should be understood that the depth of the cavity is alterable to fit any suitable depth required by any specific application.

Second optical part 113 generally is molded separately from first optical part 112 and assembled by any suitable method, such as manually, semi-automatically, automatically. Preferably, first and second optical parts are assembled automatically. Second optical part 113 is made of identical or similar materials as first optical part 112. Second optical part 113 is molded so as to cover and fit together with first optical part 112.

Joining of first optical part 112 and second optical part 113 is achieved by any suitable optical adhesive, such as polyimides, epoxies, polymers, plastics, or the like. Generally, joining of first optical part 112 and second optical part 113 is achieved by any suitable method. For example, an appropriate amount of the optical adhesive is applied to first optical part 112. Subsequently, second optical part 113 is pressed into optical part 112, thereby filling the cavity and the first and the second plurality of grooves, thus making the free space area 108 and the first and the second plurality of core regions 104 and 107. Alternatively, the first and the second optical parts 112 and 113 are held together and optical adhesive is then applied into the first and the second plurality of grooves and the cavity by any suitable method, such as micro injection, vacuum injection, or the like, making the first and the second plurality of core regions 104 and 107 and the free space area 108.

By way of example only, with an individual groove being rectangular in shape and with a width or a distance 127 and a depth 126 being approximately the same, distance 127 ranges from 2.0 microns to 100.0 microns with center to center spacing ranging from at least 2.0 microns. In a preferred embodiment of the present invention, individual grooves of the first and the second plurality of grooves are formed having both depth 126 and width 127 having dimensions ranging from 25.0 microns to 75.0 microns, Second optical part 113 of optical portion 103 is subsequently joined to first optical part 112. Joining of first optical part 112 and second optical part 113 to form optical portion 103 is achieved by an optical epoxy, thereby adhering first optical part 112 and second optical 113 together. The optical epoxy fills the first and second plurality of grooves, as well as the cavity, thereby generating the first and second plurality of core regions 104 and 107, as well as free space area 118.

Further, alignment devices 116 are used to guide first and second optical connector 109 and 111 to star coupler 101. More specifically, alignment guides 117, such as openings, ferrules, pins, or the like are positioned on first and second end surfaces 118 and 119 of molded star coupler 101. In a preferred embodiment of the present invention, alignment guides 117 found on both first and second end surfaces of optical portion 103 are ferrules or openings, thereby allowing alignment pins 122 of optical connectors 109 and 111 to be detachably engaged with star coupler 101. However, it should be evident to one skilled in the art that a variety of alignment guides configurations can be used to bring optical connectors 109 and 111 into an operably coupled position with star coupler 101.

Optical connectors 109 and 111 include several common elements, such as bodies 131 and 131' optical cables 132 and 132', and coupling surfaces 133 and 133'. Bodies 131 and 131' of optical connectors 109 and 111 are manufactured by any suitable method, such as molding, milling, or the like; however, it should be understood that in a preferred embodiment of the present invention bodies 131 and 131' are designed for ergonomic use, thus facilitating attachment and detachment of bodies 131 and 131' to star coupler 101. Additionally, bodies 131 and 131' incorporate optical cables 132 and 132'.

Optical cables 132 and 132' include a plurality of optical fibers (not shown) that are spatially arranged in bodies 131 and 131' so as to provide coupling surfaces 133 and 133'. Coupling surfaces 133 and 133' arrange the optical fibers in a geometric pattern similar to the pattern of the plurality of core regions 104 and 107 respectively, thus enabling alignment of the optical fibers with the plurality of core regions 104 and 107 respectively.

Engagement of optical connectors 109 and 111 to their respective end surfaces 118 and 119 allows a light signal or light signals to enter from one of the optical fibers in one of the two optical cables 132 or 132'. The light signal or the light signals are passed across either coupling surfaces 133 or 133' and into one of either the first or the second plurality of core regions 104 or 107. The light signal or the light signals are mixed and divided in free space area 108 and exit through an opposite plurality of core regions 104 or 107. For example, with light beam transmitted through optical cable 132 through body 131 into coupling surface 133 of optical cable 109, the light signal enters the plurality of core regions 104 and is mixed in free space area 108. The light signals mixed in free space area 108 are subsequently transmitted and divided into the plurality of core regions 107. The divided light signals are passed through coupling surface 133' of optical connector 111. The light signal or light signals transmitted to coupling surface 133' of optical coupler 111 are subsequently transmitted to the appropriate optical fibers in optical cable 132'.

By now it should be appreciated that an article and method for making a molded star coupler have been described. The method allows for a highly manufacturable and cost effective method that provides accurate alignment of optical fibers to the molded star coupler for effective and efficient mixing. Further, this method allows for automated manufacturing which further reduces cost.

What is claimed is:

1. A method for making a molded star coupler comprising the steps of:

molding a first optical portion having a major surface, a first end surface and a second end surface, the major surface including a free space area, a first plurality of grooves with a first plurality of ends and a second plurality of ends, a second plurality of grooves with a first plurality of ends a second plurality of ends molded simultaneously with the major surface of the first optical portion, i. molding the first plurality of ends of the first plurality of grooves at the first end surface of the molded first optical portion and the second plurality of ends connected to the free space area with the first plurality of grooves extending therebetween, thus interconnecting the first plurality of grooves to the free space region, and ii. molding the first plurality of ends of the second plurality of grooves at the second end surface of the molded first optical portion and the second plurality of ends connected to the free space area with the second plurality of grooves extending therebetween, thus interconnecting the first plurality of ends of the second plurality of core regions to the free space region; and applying an optical media to the surface of the first optical portion filling the first and second plurality of grooves and the free space area, thereby fabricating a molded star coupler.

2. A method for making a molded star coupler as claimed in claim 1 further comprising the steps of disposing an alignment guide in the first end surface of the first optical portion.

3. A method for making a molded star coupler as claim in claim 1 further including the steps of:

molding a second optical portion; and attaching the second optical portion to the surface of the first optical portion, thereby covering the first and the second plurality of grooves and the free space area.

* * * * *